United States Patent [19]

Klein et al.

[11] Patent Number: 5,246,211
[45] Date of Patent: Sep. 21, 1993

[54] HYDRAULIC MOUNT WITH SPRING-LOADED DECOUPLER FOR TUNED RATE DIP

[75] Inventors: Robert R. Klein, Centerville; Stanley E. Smith, Dayton, both of Ohio

[73] Assignee: General Motors Corporation, Detroit, Mich.

[21] Appl. No.: 912,358

[22] Filed: Jul. 13, 1992

[51] Int. Cl.$^5$ .................... F16F 9/10; F16F 13/00
[52] U.S. Cl. .................... 267/140.13; 267/219
[58] Field of Search ............ 267/140.13, 219, 220, 267/140.11, 140.14, 140.12; 180/300, 312, 902; 248/562, 636, 638; 188/320

[56] References Cited

U.S. PATENT DOCUMENTS

| | | | |
|---|---|---|---|
| 4,428,569 | 1/1984 | Takei | 267/140.1 |
| 4,588,173 | 5/1986 | Gold et al. | 267/140.1 |
| 4,733,854 | 3/1988 | Miyamoto | 267/140.13 |
| 4,739,962 | 4/1988 | Morita et al. | 267/140.13 X |
| 4,756,513 | 7/1988 | Carlson et al. | 267/140.13 |
| 4,768,760 | 9/1988 | Le Fol | 267/140.12 |
| 4,783,062 | 11/1988 | Hamberg et al. | 267/140.1 |
| 4,893,797 | 1/1990 | Le Fol et al. | 267/140.13 |
| 4,903,951 | 2/1990 | Miyamoto et al. | 267/140.13 |
| 4,958,811 | 9/1990 | Brenner et al. | 267/219 X |
| 4,971,300 | 11/1990 | Ticks | 267/219 X |
| 4,986,510 | 1/1991 | Bellamy et al. | 267/140.13 X |
| 5,029,824 | 7/1991 | LaBeau et al. | 267/140.13 |
| 5,058,866 | 10/1991 | Hamaekers et al. | 267/219 X |
| 5,092,565 | 3/1992 | Hamaekers et al. | 267/140.12 |
| 5,112,032 | 5/1992 | Klein et al. | 267/219 X |

FOREIGN PATENT DOCUMENTS

| | | | |
|---|---|---|---|
| 57-84221 | 5/1982 | Japan | 267/140.13 |
| 58-5549 | 1/1983 | Japan | 267/140.13 |
| 58-72741 | 4/1983 | Japan | 267/140.13 |
| 60-175834 | 9/1985 | Japan | 267/140.13 |
| 0248934 | 11/1986 | Japan | 267/219 |
| 63-30623 | 2/1988 | Japan | 267/140.13 |
| 1-74334 | 3/1989 | Japan | 267/140.13 |
| 2-26336 | 1/1990 | Japan | 267/140.13 |

*Primary Examiner*—Douglas C. Butler
*Attorney, Agent, or Firm*—Kevin M. Hinman

[57] ABSTRACT

A hydraulic mount assembly includes a pair of mounting members connected together to form a hollow elastomeric body closed by a resilient diaphragm so as to form a cavity for a damping liquid. A partition divides the cavity into a primary chamber formed between the partition and the hollow body and a secondary chamber formed between the partition and the diaphragm. The partition also includes a primary orifice track, a secondary orifice track and a decoupler passage providing fluid communication between the chambers. A first decoupler is mounted for limited reciprocating movement in the decoupler passage. A spring biases the first decoupler to a seated position sealing the passage. A second decoupler is mounted for limited reciprocating movement in the secondary orifice track. The primary orifice track establishes a first resonance frequency for the damping liquid. Similarly, the secondary orifice track establishes second, higher resonance frequency. Further, the force provided by the coil spring against the first decoupler is overcome by fluid pressure at a third resonance frequency higher than that of the second resonance frequency. Together these structures function to provide a rate dip and improved relatively high frequency tuning in a fully passive mount assembly.

1 Claim, 2 Drawing Sheets

HYDRAULIC MOUNT WITH SPRING-LOADED DECOUPLER FOR TUNED RATE DIP

TECHNICAL FIELD

The present invention relates generally to hydraulic mounts for vibration damping and, more particularly, to a fully passive hydraulic mount assembly designed to provide tunable or variable damping characteristics, including a dynamic rate dip or decrease at a specific frequency.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986, entitled "Hydraulic-Elastomeric Mount" and assigned to the assignee of the present invention.

The hydraulic mount assembly of this prior invention includes a reinforced, hollow rubber body that is closed by a resilient diaphragm so as to form a cavity. This cavity is partitioned by a plate into two chambers that are in fluid communication through a relatively large central opening in the plate. The first or primary chamber is formed between the plate and the body. The secondary chamber is formed between the plate and the diaphragm.

A decoupler is positioned in the central opening of the plate and reciprocates in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes as occur at generally higher frequencies, fluid flow between the chambers is substantially avoided and undesirable hydraulic damping is eliminated. In effect, this freely floating decoupler is a passive tuning device.

In addition to the relatively large central opening, an orifice track with a smaller, restricted flow passage is provided, extending around the perimeter of the orifice plate. Each end of the track has an opening. One opening communicates with the primary chamber. The other opening communicates with the secondary chamber. The orifice track provides the hydraulic mount assembly with another passive tuning component, and when combined with the freely floating decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. Large amplitude vibrating input, such as heavy engine loading during sudden accelerations or panic stops, produces high velocity fluid flow through the orifice track, and accordingly, a high level of damping force and desirable smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler and through the central opening thereby smoothing the transition.

This basic mount design has proved quite successful, and represents a significant advance over the prior art engine mounts, particularly those of the solid rubber type. More specifically, hydraulic mounts provide a more favorable balance of load support and damping control. It should be appreciated, however, that additional improvement in operating characteristics is still possible.

To this end, more recent developments in hydraulic mount technology have lead to the advent of electronic control of the dynamic characteristics of the mount. Active, rather than passive, control allows more efficient and effective isolation of vibrations and suppression of noise. A previously developed hydraulic mount of the active control type is disclosed in U.S. Pat. No. 4,783,062 to Hamberg et al., issued Nov. 8, 1988, entitled "Electronic Hydraulic Mount/Internal Solenoid" and assigned to the assignee of the present invention.

In this mount assembly, the partition includes three passages connecting the primary and secondary chambers. One of the passages is a central opening, but no decoupler is specified in the preferred embodiment. Two additional passages of varying length form orifice tracks providing unique damping characteristics tuned to isolate selected frequencies of vibration and provide the desired engine control. A sliding gate extends across the entry to the central opening and the two passages. This gate is displaceable to direct the flow of fluid between the primary and secondary chambers through a selected passage or passages in the partition.

A solenoid actuator mounted on the partition includes multiple electric coils that allow the positive positioning of the gate. A control circuit with on-board transducers is provided to monitor vehicle operating and road conditions. A microprocessor acts in response to the sensed conditions causing the necessary sequential energization of the series of coils to properly position the gate and provide the desired damping characteristics.

The mount assembly described in the Hamberg et al. patent is particularly adapted for tuning to the specific resonance frequencies characteristic of the vehicle component being damped. This allows the mount assembly to more efficiently and effectively isolate vibrations and suppress noise over a wide range of vehicle operating and road conditions.

While the mount assembly disclosed in the Hamberg et al. patent may be very effectively tuned to provide the desired damping and dynamic rate characteristics over a wide range of vehicle operating conditions, still further improvements in mount assembly design are possible. More particularly, it is desirable to provide a mount assembly that relies upon passive tuning features to provide operating and performance characteristics substantially as effective as those provided by an active tuning system. Such a passive, mechanically actuated mount assembly is significantly less expensive to produce requiring neither electrical nor pneumatic control. Additionally, no sensors for monitoring operating conditions are required. Accordingly, such a system is also less complicated and more reliable.

Further, it is particularly desirable to provide a passive mount assembly that is tuned to exhibit a reduced dynamic rate over a selected range of low or small amplitude/relatively high frequency engine vibrations. More particularly, present state of the art mount assemblies, either passive or active, do not fully compensate for the change in the flow characteristics of the hydraulic fluid that is believed to take place at higher frequencies; i.e. the fluid transitions from laminar to turbulent flow causing a change in expected operational characteristics. As a result of the turbulent flow, both the decoupler passage and orifice track(s) become restricted, eventually becoming effectively choked off. This prevents continued fluid flow between the chambers that is critical for proper damping and vibration/noise control.

The flow cut-off results in a significant pressure buildup in the primary chamber of the mount that causes a very sharp increase in the dynamic rate characteristics. The resulting increase in stiffness caused by the high dynamic rate prevents the best suppression and isolation of low amplitude/relatively high frequency vibrations. A need is therefore identified for a mount assembly providing improved tuning of the higher frequencies; that is, in the range of 10–200, and particularly in the low-to-medium part of the range.

SUMMARY OF THE INVENTION

Accordingly, it is a primary object of the present invention to provide a hydraulic mount assembly overcoming the above-described limitations and disadvantages of the prior art.

Another object of the present invention is to provide an improved hydraulic mount assembly furnishing fully passive relatively high frequency tuning for better vibration and noise suppression, while maintaining the desired damping to control the motion of the operating component.

Still another object of the present invention relates to providing a mount assembly that is passively tuned to better control higher frequency vibration and noise, and at the same time enhance the effect of other components designed to control high or large amplitude vibration at relatively lower frequencies. Such a mount may, for example, be utilized to provide significantly enhanced isolation of vibration/noise at 20–30 Hz for a noticeably smoother idle, while simultaneously maintaining a relatively low dynamic rate at higher frequencies up to and beyond 200 Hz.

Yet another object of the present invention is to provide a hydraulic mount assembly incorporating primary and secondary orifice tracks, a spring loaded main decoupler and a secondary decoupler in the secondary track.

A related objective is to provide a mount assembly that may be tuned to passively provide operating characteristics that efficiently and effectively isolate vibrations, suppress noise and dampen undesired motion over a broad range of vehicle operating conditions. Further, this is accomplished in a manner substantially as effective as more expensive active tuning systems.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly for an operating component of a vehicle is provided. The mount assembly is particularly adapted to produce variable damping characteristics that are passively tuned to provide the necessary vibration isolation and damping of component displacements ideally suited for smooth vehicle operation.

The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes a primary orifice track, a secondary orifice track and a decoupler passage for providing fluid communication between the primary and secondary chambers. A first or main decoupler is captured in the decoupler passage for limited reciprocating movement. The decoupler is actually positioned in a cavity, in the form of an annular groove formed in the passage.

According to an important aspect of the invention, means are provided for biasing this decoupler toward the primary chamber and into sealing engagement with the partition. In this way fluid flow through the decoupler passage is restricted or cut off in response to relatively low or small amplitude, low-to-medium frequency vibrations. Only at a selected higher frequency and increased fluid pressure is the biasing force overcome to unseat the decoupler and allow full fluid flow through the decoupler passage. Preferably, the biasing means is a coil spring seated against the bottom face of the decoupler. In an alternative embodiment, the biasing means may include an annular array of spaced resilient fingers integral with and extending from the rubber cushioning flange or ring on the decoupler, and seated on a ledge within the decoupling passage.

In accordance with a further aspect of the present invention, a second decoupler is provided in the secondary orifice track This decoupler is not biased in the manner of the main decoupler but, in contrast, freely reciprocates within a similar mounting cavity/annular groove formed in the partition.

In response to relatively high or large amplitude, low frequency vibrational inputs such as occur, for example, at some resonant frequencies and during hard cornering or acceleration of the vehicle, both of the above-described decouplers are effectively seated against the partition. This serves to seal the decoupler passage and the secondary orifice track.

Accordingly, damping fluid is forced to pass between the primary and secondary chambers of the mount assembly substantially exclusively through the primary orifice track. The relatively restricted flow of fluid through the primary orifice track furnishes a high dynamic rate that serves to dampen the vibrations, thereby ideally controlling the large engine (or other component) displacements by suppressing the vibrations.

It should be appreciated that the column of damping fluid within the primary orifice track resonates at a particular frequency that is a function of the cross-sectional area and length of the orifice track. Accordingly, the primary orifice track may be sized and thereby custom tuned to provide the desired damping response for controlling the displacements of the particular operating component carried on the mount assembly.

In response to relatively low or small amplitude, relatively higher frequency vibration inputs the primary decoupler remains seated against the partition under the force of the biasing spring. The freely reciprocating decoupler in the secondary orifice track, however, does not seat, thereby allowing damping fluid to pass through the secondary orifice track around the secondary decoupler and between the primary and secondary chambers. This track is sized and shaped and thereby tuned to provide a dynamic rate dip at a specific frequency of between 10 and 200 Hz, preferably in the present case between 20-30 Hz.

More specifically, the column of fluid within the secondary or dynamic rate reducing orifice track is designed to resonate at a second frequency higher than the first frequency at which the column in the primary orifice track resonates. This is more fully described in the copending application U.S. Ser. No. 07/898,644, filed Jun. 15, 1992 entitled "Hydraulic Mount with Improved Low Amplitude, Low-to-Medium Frequency Vibration Isolation", assigned to the assignee of the present invention.

Accordingly, fluid communicating between the primary and secondary chambers passes substantially exclusively through the secondary orifice track, as this represents the path of least resistance. As a result, the damping effect is significantly reduced and a relatively soft mount provides good isolation of the relatively low or small amplitude, relatively higher frequency vibration and noise.

Finally, the mount assembly of the present invention provides a third distinct mode of operation. This third mode is in response to relatively low or small amplitude, but still higher frequency vibrations. These higher frequency vibrations are those that cause turbulence in the damping fluid which effectively restricts and chokes off flow through the primary and secondary orifice tracks. As a result, pressure begins to build in the primary chamber. This pressure buildup eventually is sufficient to cause the spring loaded decoupler in the decoupler passage to be unseated.

The resulting flow through the decoupler passage relieves the pressure buildup or spiking that would otherwise continue to occur in the primary chamber as a result of lowering the dynamic rate to get better performance at a specific resonant frequency. Advantageously, by allowing the passage of fluid through the decoupler passage, and the instant pressure reduction, laminar fluid flow is re-established. Accordingly, normal function and flow through the primary and secondary orifice tracks is restored to improve damping and engine control under these extreme conditions.

In other words, the dynamic rate does not continue to increase sharply in a manner characteristic of prior art tuned mount assemblies being subjected to vibratory inputs at these troubling higher frequencies. Instead, the dynamic rate curve flattens so as to provide better isolation of low/small amplitude, relatively higher frequency vibrations.

It should be appreciated that the point of flattening of the dynamic rate curve may be selected to tune the operating characteristics of the mount assembly to the particular vehicle component and application. By controlling the force provided to bias the decoupler against the partition, and thereby seal the decoupler passage, the performance characteristics of the mount assembly may also be altered to provide the desired dynamic rate curve and damping for appropriate response to certain vehicle operating conditions. In particular, the force provided is designed to be overcome by fluid pressure in the primary chamber characteristic of a third resonance frequency higher than the second resonance frequency.

From the above, it should be appreciated that by carefully selecting the resonance frequencies of the damping fluid tracks or columns in the primary and secondary orifice tracks of this passive mount, as well as the force provided by the biasing spring against the decoupler, the full range of operating characteristics of the mount including damping, dynamic rate and stiffness may be very effectively tuned to efficiently provide the desired response. As a result, smoother, quieter vehicle operation is provided. In effect, the relatively inexpensive passively tuned mount assembly provides very effective operation closely mimicking that available with responsive active mount assemblies of significantly higher complexity and cost.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
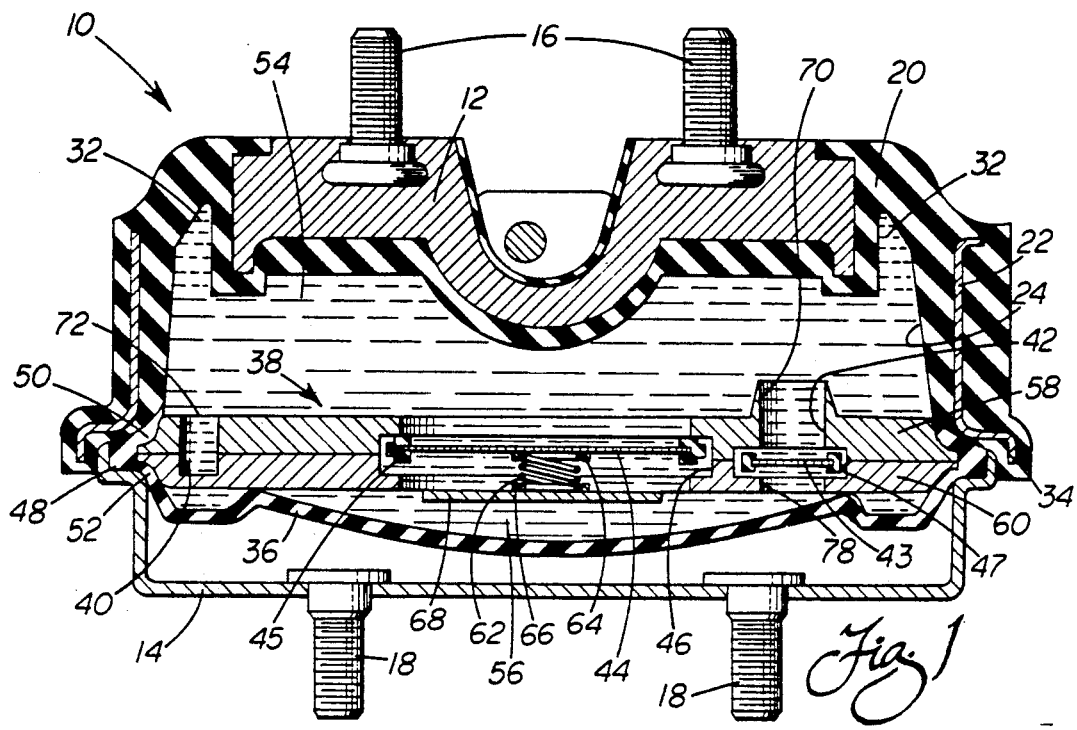
FIG. 1 is a cross-sectional view of the hydraulic mount assembly of the present invention.

Reference will now be made in detail to the present preferred embodiment of the invention, an example of which is illustrated in the accompanying drawing.

DETAILED DESCRIPTION OF THE INVENTION

Reference is now made to the drawing showing the improved hydraulic-elastomeric mount assembly 10 of the present invention, particularly adapted for mounting an internal combustion engine (and/or transmission or similar component) in a vehicle. The dynamic characteristics of the mount assembly 10 are tuned to meet the needs of the specific application. As a result, the desired dynamic rate best suited to isolate a particular range of vibration/noise conditions may be obtained.

The mount assembly 10 includes a cast aluminum mounting member 12 and stamped sheet metal mounting member 14. The mounting members 12 and 14 each have a pair of studs 16, 18, respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body 20 may be molded to and about the mounting member 12 and to both the interior and exterior of an oval shaped stamped sheet metal retainer 22. The body 20 is configured to form a hollow cavity 24 for receiving a damping liquid, such as a commercial engine antifreeze coolant.

Voids 32 are provided in the body 20. These voids 32 assist in providing directional dynamic rate control within the elastomeric body 20 and are part of the damping liquid cavity 24. As is known in the art, such voids 32 are especially useful in isolating certain internal combustion engine vibrations.

Figure 2:
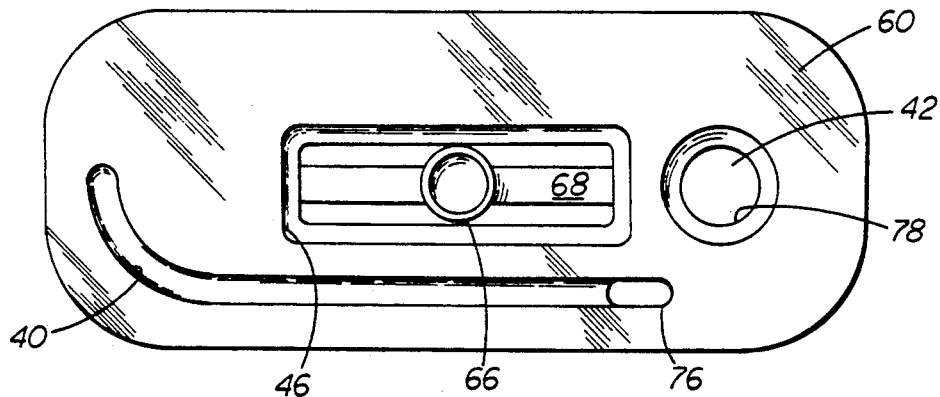
FIG. 2 is a plan view of the top face of the bottom plate of the partition showing the primary and secondary orifice tracks and the support member for the biasing spring.

Together, the mounting member 12, elastomeric body 20 and metal retainer 22 form a first subassembly or cover of the mount assembly 10. The retainer 22 includes an outwardly projecting collar 34 at its lower periphery. The collar 34 is formed to receive a second subassembly or base. This second subassembly comprises the mounting member 14, an elastomeric diaphragm 36 of natural or synthetic rubber and a partition 38. The partition 38 includes a primary orifice track 40 and a secondary orifice track 42 that provide varying degrees of damping liquid flow (see also FIG. 2, illustrating the lower portion of the partition 38).

A secondary decoupler 43 is provided in the secondary orifice track 42. The decoupler 43 freely reciprocates in the annular groove 47. The decoupler 43 controls the flow of fluid through the secondary track 42 depending upon the amplitude/frequency of vibratory inputs to the mount.

Additionally, a main decoupler 44 is captured for limited reciprocal movement within a decoupler passage in the partition 38. This decoupler 44 is shown as a rectangular plate. It should be appreciated, however, that the shape of this decoupler passage and the decoupler, as well as the round shape of the secondary decoupler 43 and the track 42, may be varied, if desired. Selection of a particular shape, as well as length, assists in providing a particular operating characteristic.

As shown, the decoupler 44 is mounted for limited up and down reciprocal movement in a cavity, in the form of an annular groove or channel 46, formed between partition plates 58, 60 of the partition 38. The respective upper and lower faces of the decoupler 44 are directly engaged by the damping liquid within primary and secondary chambers 54, 56. An elastomeric cushioning ring 45 formed of natural or synthetic rubber may be molded to the decoupler about the perimeter thereof to not only assure a firm seal, but also, to guard against chatter as the decoupler seats itself. Similarly, the secondary decoupler includes a cushioning ring for the same functions.

Advantageously, the main decoupler 44 is biased against the upper partition plate 58 of the partition 38 so as to normally seal the decoupler passage. This biasing may be provided by means of a coil spring 62 held in position by a seat 64 on the bottom of the decoupler 44, and a corresponding seat 66 on a support member or spider 68 fixed to the lower partition plate 60.

The required rate of the spring 62 may be determined in accordance with the following analysis. First, the desired resonance frequency at which the decoupler 44 is to be unseated is selected. The fluid pressure in the primary chamber 54 characteristic of that frequency for a particular vibratory amplitude characteristic of the component to be mounted is then determined. For example, the fluid pressure at 40 Hz for a vibratory input of ±0.1 mm is 0.89 psi (see FIG. 4). The surface area of the decoupler 44 is then determined (e.g. 1.18135 square inches).

The force acting on the decoupler at a frequency of 40 Hz is then determined utilizing the formula $F=PA$, wherein $F$=force, $P$=pressure and $A$=area. For this example, the force $F=1.05$ lbs. The desired displacement of the decoupler is then identified (0.047 inches, in this sample embodiment computation). The required spring rate is then determined utilizing the formula $K=F/d$, wherein $K$=spring rate, $F$=force and $d$=displacement. Hence, the spring rate in the sample computation is 22.3 lbs/in. The closest standard spring rate of 24 pounds/inch is selected. The operation and advantageous effect of the decoupler 44 and the biasing spring 62, especially in accordance with this representative embodiment patterned after the curves in FIGS. 4 and 5, will be described in greater detail below.

Figure 3:
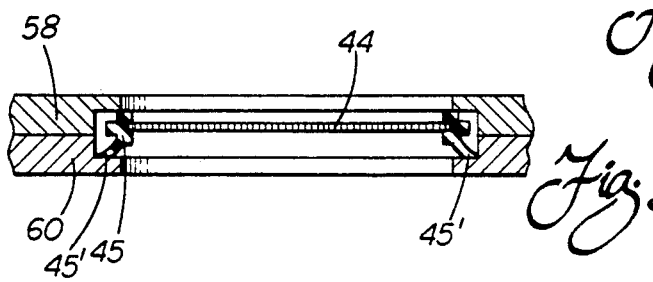
FIG. 3 is a cut-away, cross-sectional view of an alternative arrangement of the decoupler and biasing springs integral with the cushioning ring.

An alternative spring arrangement is shown in FIG. 3, wherein the same reference numbers are used for the same elements. The coil spring 62 is replaced by spaced, resilient fingers 45' integral with the cushioning ring 45. As the pressure builds over the decoupler 44, the fingers 45' flex and bend, allowing the decoupler to be unseated. Once the pressure returns to normal, the fingers 45' push the decoupler back to the closed position. Since the fingers are spaced around the decoupler, the transitional fluid flow is not interrupted.

The elastomeric diaphragm 36 includes an annular rim section 48 having a radially inwardly facing internal groove formed between upper and lower shoulders 50, 52, respectively. The shoulders 50, 52 are flexible so as to receive the periphery of the partition 38. Thus, the periphery of the partition 38 is sealingly engaged by the shoulders 50, 52 on opposite sides of the groove.

The lower mounting member 14 is formed with a collar to receive the rim 48 of the diaphragm 36. The collar of the mounting member 14 fits within the collar 34 of the retainer 22. As is known in the art, tabs (not shown) may be provided on the collar 34 and bent over to retain the whole mount assembly together.

The elastomeric diaphragm 36 closes the elastomeric body 20 so as to form therewith the closed damping cavity 24. This cavity 24 is divided by the partition 38 into the primary chamber 54 enclosed by the elastomeric body 20 and the secondary chamber 56 enclosed by the diaphragm 36.

The partition 38 is formed of die cast metal, or may be plastic and includes a pair of plates 58, 60 with matching peripheries. These plates 58, 60 span the cavity 24 and cooperate to define the two damping orifice tracks 40, 42 that connect the chambers 54, 56. A cylindrical extension 70 of the desired length and diameter is mounted to the upper partition plate 58 in order to adjust the length and cross-sectional area of the secondary orifice track 42. This allows the resonance frequency of the column of damping fluid within this secondary track 42 to be tuned to provide the desired operating characteristics for the mount assembly 10.

An opening 72 is provided in the upper plate 58 at one end of the orifice track 40 through which the track communicates with the primary chamber 54. A similar opening is provided in the cylindrical extension 70 of the secondary orifice track 42. Openings 76, 78 are also provided in the lower plate 60 at the opposite end of each of the orifice tracks 40, 42, respectively, for communication with the secondary chamber 56. Of course, the orifice track 40 may also be formed to a selected length and cross-sectional area so as to provide the mount with desired lower frequency damping characteristics.

In operation, the mount assembly 10 of the present invention passively provides three distinct operating modes, the mode selected being determined by the amplitude and frequency of the vibratory inputs. For example, in response to relatively high or large amplitude, lower frequency vibrational inputs, such as occur at resonant excitation of the engine or other operating component and during hard cornering or acceleration of the vehicle, the primary chamber 54 is initially subjected to a significant compression. This tends to reduce the volume of the primary chamber 54, thereby causing a rapid and substantial increase in fluid pressure within the chamber.

In response to this increase in pressure, the secondary decoupler 43 is seated. This action serves to seal the secondary orifice track 42. Next, the increase in fluid pressure is sufficient to overcome the biasing force of the coil spring 62, and seat the main decoupler 44 against the lower partition plate 60, sealing the decoupler passage.

During the transition of the decoupler 44 from one seated position to the other, some damping fluid bypasses the decoupler 44 through the decoupler passage into the secondary chamber 56. This releases some pressure in the primary chamber smoothing the operation of the mount assembly 10. Once the decoupler 44 is seated, damping fluid is now forced to pass from the primary chamber 54 exclusively through the primary orifice track 40 to the secondary chamber 56. As this occurs, it should be remembered that the diaphragm 36 expands to increase the volume of the secondary chamber 56, and thus accommodates the inflow of damping fluid.

As the mounted operating component rebounds, the elastomeric body 20 is placed in tension and the primary chamber 54 is effectively expanded. As a result, pressure is reduced in the primary chamber and the resilient memory of the diaphragm 36 forces the damping fluid back into the primary chamber 54. Both decouplers 43, 44 are immediately seated against the upper partition plate 58 by the fluid pressure. The decoupler 44 is seated momentarily before the decoupler 43 due to the helper action of the spring force. The fluid then once again must pass through the primary orifice track 40. This cycle continues until the larger amplitude, lower frequency vibrational input is fully damped and suppressed.

Of course, it should be appreciated that the restricted flow of fluid through the primary orifice track 40 at these lower frequencies furnishes the relatively high dynamic rate, and thus damping force desired, to control the engine displacement and bring about quick suppression. This action takes place primarily at a lowest frequency range, such as below 20 Hz. Further, it should be appreciated that the column of damping fluid within the primary orifice track 40 resonates at a particular frequency that is a function of the cross-sectional area and length of the orifice track. Thus, the primary orifice track is custom tuned to provide the desired damping response for controlling these troublesome displacements of the operating component carried by the mount assembly 10.

A second mode of operation is provided in response to relatively low or small amplitude, low-to-medium frequency vibratory inputs. More specifically, the coil spring 62 maintains a sufficient biasing force to keep the main decoupler 44 seated against the upper plate 58 of the partition 38. Accordingly, the decoupler passage 46 remains sealed. In contrast, the decoupler 43 in the secondary orifice track 42 is unseated allowing damping fluid to bypass around the secondary decoupler, and flow from the primary to the secondary chamber 54, 56, respectively. As the secondary orifice track 42 is designed to be less restrictive than the primary orifice track 40, it has a lower resistance to flow. Thus, under relatively low amplitude, relatively low-to-medium frequency vibratory conditions fluid flow between the chambers 54, 56 is effectively limited to that provided through the secondary track 42.

In accordance with an important aspect of the invention, the secondary orifice track 42 is also sized and shaped, and thereby tuned for this second operational mode to provide a dynamic rate dip at a specific frequency between 10 and 200 Hz, such as the range of 20–30 Hz. Accordingly, this secondary orifice track 42 provides a column of fluid designed to resonate at this second frequency range higher than the first resonate frequency of the primary track 40. Thus, the damping effect remains relatively low and the curve relatively flat to provide a relatively soft mount exhibiting good isolation characteristics of the lower amplitude, low-to-medium frequency vibration/noise (see the dip in the dynamic rate in FIG. 4, and the flat damping curve in FIG. 5).

The third distinct mode of operation of the mount assembly 10 of the present invention is also provided in response to relatively low or small amplitude, but relatively higher frequency vibrations. Such vibratory inputs tend to restrict and choke off flow, primarily through the secondary track 42, thereby causing the fluid pressure to build in the primary chamber 54 to unusually high levels, until eventually the pressure is sufficient to overcome the biasing force of the coil spring 62. This occurs at a third resonance frequency, higher than the second resonance frequency. Accordingly, the main decoupler 44 is unseated, thereby allowing the passage of damping fluid around and through the decoupler passage 46 between the primary and secondary chambers 54, 56.

The resulting flow relieves the turbulence generated pressure buildup that would otherwise continue to occur in the primary chamber 54. Once the pressure is relieved, and the blocking force is removed, the fluid flow through the secondary orifice track 42 is restored. Thus, damping is allowed, and indeed increased by a controlled amount, at these troublesome higher frequencies for better overall engine control. The dynamic rate of the mount assembly does not continue to increase sharply (see dashed line curve in FIG. 4), as would otherwise be expected when the desired dip in the rate (20–30 Hz) is obtained, but in fact, remains relatively flat (see comparison in FIG. 4). Accordingly, significantly improved isolation of low or small amplitude, relatively higher frequency vibration/noise is provided.

Advantageously, it should be appreciated that both (a) the frequency range of the rate dip, and (b) the range of the flattening of the dynamic rate curve may be selected in order to tune the operating characteristics of the mount assembly. The tuning allows the desired reduction in damping (see FIG. 5), and thus the corresponding softness of the mount for a particular application to be selected. Key adjustments to be made include the length and cross-sectional area of the secondary orifice track 42, and the force of the biasing spring 62. In combination, these two features provide the ability to select and obtain exceptional performance characteristics of a mount. The desired dynamic rate curve and appropriate response to certain specific vehicle operating conditions is superior to the results gained from use of the secondary orifice track 42 alone (see the copending application mentioned above).

Figure 4:
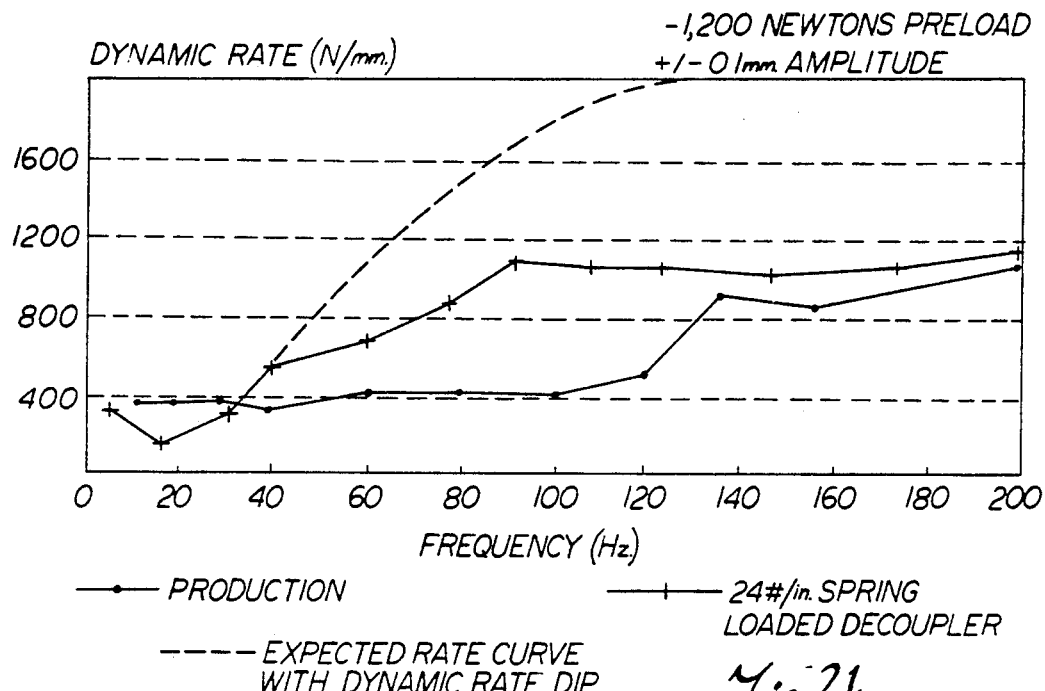
FIGS. 4 and 5 are graphical representations theoretically showing how the dynamic rate/damping of the present invention may be tuned by varying (a) the length and cross-sectional area of the secondary orifice track to provide a dip at a selected frequency, and (b) how the force of the biasing spring provides a flattening of the dynamic rate curve along the higher frequency range.
Figure 5:
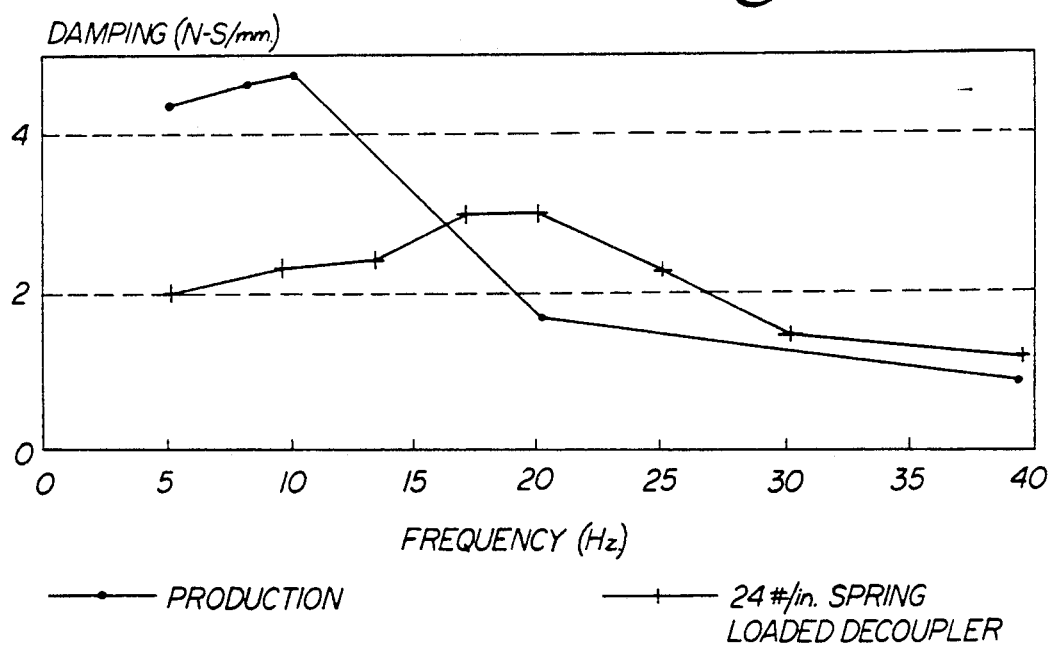

As demonstrated in FIG. 4, the length and cross-sectional area of the secondary orifice track 42 have been selected to provide a rate dip at a frequency of approximately 20-30 Hz to, for example, provide significantly enhanced isolation of engine idle vibration/noise. As such vibrations are particularly noticeable to passengers in a vehicle, it is highly desirable to provide this softening of the mount and smoothing action in this range.

As also clearly demonstrated, by selecting a coil spring 62 with a biasing force that closely matches the calculations set forth above (24 pounds/inch, FIG. 4 and 5), the dynamic rate curve is flattened at the higher frequencies up to, including and above 200 Hz. The effective reduction in the dynamic rate at the higher frequencies, such as above 40 Hz, is graphically illustrated by the area between the full and dashed line curves.

In summary, numerous benefits result from employing the concepts of the present invention. More particularly, a relatively inexpensive, passive mount assembly 10 is provided furnishing enhanced performance and operating characteristics rivaling those available up until this time only in more expensive active system assemblies. More particularly, the mount assembly 10 is tunable to provide a rate dip that may be effectively utilized to provide improved isolation of low or small amplitude, relatively low-to-medium frequency engine idle vibration/noise.

Advantageously, the mount assembly 10 does this by employing the combination of the spring biased decoupler 44 and the secondary orifice track 42. The fluid flow around the decoupler 44 advantageously serves to release built-up fluid pressure in the primary chamber 54, thereby flattening the dynamic rate curve and providing a softer mount at the higher frequencies. This improved isolation of low amplitude, relatively higher frequency vibrations that have been so difficult to effectively isolate in the past is a distinct advantage.

The foregoing description of a preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in the various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A hydraulic mount assembly for an operating component of a vehicle, comprising:
   a pair of mounting members;
   a hollow body connected to said mounting members;
   a resilient diaphragm closing said hollow body and forming therewith a closed cavity that is filled with a damping fluid;
   means for partitioning said cavity into a primary chamber and a secondary chamber enclosed by said diaphragm;
   a primary orifice track in said partitioning means providing fluid communication between said primary and secondary chambers having a first resonance frequency;
   a second orifice track in said partitioning means providing fluid communication between said primary and secondary chambers having a second resonance frequency higher than said first resonance frequency;
   a first decoupler mounted in a passage in said partitioning means for reciprocal movement toward and away from said primary and secondary chambers;
   a support member extending across said passage and fixed to the partitioning means;
   a coil spring seated between said support member and said first decoupler to seal the decoupler passage, the force to overcome the spring and open the decoupler passage being characteristic of a pressure in said primary chamber representing a third resonance frequency higher than said second resonance frequency; and
   a second decoupler in said secondary orifice track mounted for reciprocal movement;
   whereby a tuned rate dip at a desired frequency and enhanced isolation of higher frequency vibration/noise is provided.

* * * * *